(12) United States Patent
Kim et al.

(10) Patent No.: US 7,993,765 B2
(45) Date of Patent: Aug. 9, 2011

(54) PERPENDICULAR MAGNETIC RECORDING MEDIUM

(75) Inventors: Kong Kim, Tokyo (JP); Kinobu Osakabe, Tokyo (JP); Junichi Horikawa, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 10/898,348

(22) Filed: Jul. 26, 2004

(65) Prior Publication Data

US 2005/0019608 A1    Jan. 27, 2005

(30) Foreign Application Priority Data

Jul. 25, 2003   (JP) ................. 2003/279861

(51) Int. Cl.
*G11B 5/667* (2006.01)
*G11B 5/66* (2006.01)

(52) U.S. Cl. ............... 428/829; 428/831.2; 428/836.2

(58) Field of Classification Search .................. None
See application file for complete search history.

(56) References Cited

U.S. PATENT DOCUMENTS

| | | | |
|---|---|---|---|
| 6,544,893 B2 | 4/2003 | Eto | |
| 7,083,870 B2 * | 8/2006 | Shimizu et al. | 428/828 |
| 2002/0048693 A1 | 4/2002 | Tanahashi et al. | |
| 2002/0160233 A1* | 10/2002 | Futamoto et al. | 428/694 TM |
| 2003/0064249 A1* | 4/2003 | Uwazumi et al. | 428/694 BA |
| 2003/0064253 A1 | 4/2003 | Uwazumi et al. | |
| 2003/0099866 A1 | 5/2003 | Takahashi et al. | |
| 2003/0170500 A1* | 9/2003 | Shimizu et al. | 428/694 TM |
| 2004/0001975 A1* | 1/2004 | Hikosaka et al. | 428/694 BA |
| 2004/0072027 A1* | 4/2004 | Lu et al. | 428/694 R |
| 2004/0157088 A1* | 8/2004 | Takenoiri et al. | 428/694 TP |
| 2007/0009654 A1* | 1/2007 | Watanabe et al. | 427/126.3 |

FOREIGN PATENT DOCUMENTS

| | | |
|---|---|---|
| JP | 2002-74648 A | 3/2002 |
| JP | 2002-92865 A | 3/2002 |
| JP | 2003-77122 A | 3/2003 |
| JP | 2003115106 A | 4/2003 |

* cited by examiner

*Primary Examiner* — Kevin M Bernatz

(57) ABSTRACT

In a perpendicular magnetic recording medium which includes a substrate (1) of a nonmagnetic material, first and second nonmagnetic underlayers (4 and 5) formed on the substrate, and a perpendicular magnetic recording layer (6) formed on the first and the second nonmagnetic underlayers, the first nonmagnetic underlayer is made of an amorphous nonmagnetic metal material containing a metal element which forms a face-centered cubic (fcc) crystal structure by a simple substance. The second nonmagnetic underlayer is formed on the first nonmagnetic underlayer in contact with the first nonmagnetic underlayer and made of a nonmagnetic material containing a hexagonal close packed structure. The perpendicular magnetic recording layer is formed on the second nonmagnetic underlayer in contact with the second nonmagnetic layer.

6 Claims, 1 Drawing Sheet

PERPENDICULAR MAGNETIC RECORDING MEDIUM

This application claims priority to prior Japanese application JP 2003-279861, the disclosure of which is incorporated herein by reference.

BACKGROUND OF THE INVENTION

This invention relates to a perpendicular magnetic recording medium to be loaded in a hard disk drive (HDD) of a perpendicular magnetic recording system.

In recent years, following the advancement of the information society, various types of information processing apparatuses have been proposed. Further, information recording apparatuses for use in those information processing apparatuses have been proposed also. In order to achieve a smaller size and a higher performance of the information processing apparatuses, the information recording apparatuses are required to have a greater information recording capacity and a higher recording density.

As one of the information recording apparatuses, there is known a magnetic recording apparatus, such as a hard disk drive (HDD), using a magnetic disk as a recording medium. In the magnetic recording apparatus, it is desired to achieve a large information recording capacity, for example, greater than 30 GB (gigabyte) per a 2.5-inch magnetic disk.

In order to increase the information recording capacity of the magnetic disk, it is necessary to improve both of a performance of the magnetic disk and a performance of a magnetic head for recording and reproducing an information signal to and from the magnetic disk. In order to meet the above-mentioned demand, the magnetic disk is required to achieve an information recording surface density greater than 60 Gbit/inch$^2$.

In the magnetic recording apparatus widely used at present, the magnetic disk has a magnetic recording layer of a so-called in-plane magnetic recording system (a longitudinal magnetic recording system or a horizontal magnetic recording system). In the in-plane magnetic recording system, the magnetic recording layer has a magnetization direction substantially parallel to a principal surface of the magnetic disk.

However, the in-plane magnetic recording system is disadvantageous in the following respect. Specifically, in case where crystal grains in the magnetic recording layer are reduced in size in order to carry out information recording at a high recording surface density such as 60 Gbit/inch$^2$, an influence of a demagnetizing field between neighboring crystal grains is increased so that a good recording quality may not be achieved. Further, in case where the crystal grains in the magnetic recording layer are reduced in size, the magnetic recording layer must be reduced in thickness. This results in easy occurrence of a thermal fluctuation error due to thermal magnetic aftereffect. If the thermal fluctuation error is significant, recording magnetization is attenuated with lapse of time. Eventually, recorded information can not normally be reproduced.

Under the circumstances, it is recently proposed to adopt a perpendicular magnetic recording system in the magnetic disk instead of the in-plane magnetic recording system. In the perpendicular magnetic recording system, resistance against the thermal fluctuation error is high even if the recording surface density is increased. Thus, the perpendicular magnetic recording system is a recording/reproducing system favorable for achievement of information recording at a high recording surface density.

In order to adopt the perpendicular magnetic recording system in the magnetic disk instead of the in-plane magnetic recording system, it is necessary to substantially change a structure of the recording layer. Specifically, in the magnetic disk adopting the perpendicular magnetic recording system (will hereinafter be called a "perpendicular magnetic recording disk"), an easy magnetization axis of the recording layer as a hard magnetic layer must be oriented in a perpendicular direction (normal-line direction) with respect to a principal surface of the magnetic disk.

For example, in case where the recording layer is made of a cobalt (Co) based ferromagnetic material, the easy magnetization axis of the recording layer is given by a c axis of a hexagonal close packed (hcp) crystal structure of cobalt. Therefore, in this case, the c axis of the crystal structure of cobalt must be oriented in the perpendicular direction with respect to the principal surface of the magnetic disk.

To this end, in the perpendicular magnetic recording disk, it is necessary to provide a nonmagnetic underlayer for promoting perpendicular orientation of the easy magnetization axis of the recording layer and to form the nonmagnetic underlayer and the recording layer by epitaxial growth (heteroepitaxial growth).

For example, Japanese Patent Application Publication (JP-A) No. 2003-77122 (corresponding to U.S. patent application Publication No. 2003-064253) discloses a perpendicular magnetic recording disk comprising a disk substrate of a nonmagnetic material, a seed layer (first underlayer) of a metal or an alloy having a face-centered cubic (fcc) crystal structure, a nonmagnetic underlayer (second underlayer) formed on the seed layer and made of a metal or an alloy having a hexagonal close packed (hcp) crystal structure, and a magnetic layer as a recording layer formed on the nonmagnetic underlayer.

Japanese Patent Application Publication (JP-A) No. 2002-92865 discloses a perpendicular magnetic recording disk comprising a disk substrate of a nonmagnetic material, a first underlayer formed on the disk substrate and made of titanium (Ti) or an alloy containing titanium, a second underlayer formed on the first underlayer and containing chromium (Cr), and a magnetic layer as a recording layer formed on the second underlayer.

Japanese Patent Application Publication (JP-A) No. 2002-74648 (corresponding to U.S. patent application Publication No. 2002-048693) discloses a perpendicular magnetic recording disk comprising a disk substrate of a nonmagnetic material, a soft magnetic layer formed on the disk substrate and made of ferromagnetic nanocrystals, an intermediate layer formed on the soft magnetic layer and containing nickel (Ni) as a main component and zirconium (Zr), and a magnetic layer as a recording layer formed on the intermediate layer.

Recently, the magnetic disk is required to have an information recording surface density of 100 Gbit/inch$^2$ or more. In order to achieve a perpendicular magnetic recording disk capable of carrying out information recording and reproduction in good condition at such a high recording surface density, it is necessary to more strictly control the perpendicular orientation of the easy magnetization axis of the recording layer so as to assure a predetermined S/N ratio and a predetermined resolution.

On the other hand, it is believed that the perpendicular magnetic recording disk is preferably a so-called double-layer perpendicular magnetic recording disk comprising a soft magnetic layer formed on a disk substrate and made of a soft magnetic material or ferromagnetic nanocrystals and a recording layer formed on the soft magnetic layer and made of a hard magnetic material, as described in Japanese Patent Publication Application No. 2002-74648. This is because, in the double-layer perpendicular magnetic recording disk, a suitable magnetic circuit can be formed through a magnetic head, the recording layer, and the soft magnetic layer during magnetic recording. Based on a mirror-image effect, the soft magnetic layer exhibits a function of assisting the magnetic recording. Thus, it is believed that the soft magnetic layer being formed between the disk substrate and the recording layer is a structure preferable as the perpendicular magnetic recording disk.

Disadvantageously, however, formation of the soft magnetic layer inhibits the perpendicular orientation of the recording layer. Even if the nonmagnetic underlayer is formed between the soft magnetic layer and the recording layer, the soft magnetic layer disturbs the orientation and a surface characteristic of the nonmagnetic underlayer. In this event, a desired effect of the nonmagnetic underlayer, i.e., the effect of improving the perpendicular orientation of the recording layer may not be exhibited.

In case where the structure of the recording layer of the magnetic disk is substantially changed in order to adopt the perpendicular magnetic recording system instead of the in-plane magnetic recording system as described above, a development cost and a production cost are drastically increased as compared with the magnetic disk of the in-plane magnetic recording system already widespread in the market. Therefore, an inexpensive magnetic disk may not be supplied. Further, if it is necessary to more strictly control the perpendicular orientation during deposition of the recording layer as described above, the production cost of the perpendicular magnetic recording disk will further be increased.

SUMMARY OF THE INVENTION

It is a first object of this invention to provide a perpendicular magnetic recording medium comprising a recording layer excellent in perpendicular orientation so as to achieve a higher recording surface density.

It is a second object of this invention to provide a magnetic recording medium comprising a soft magnetic layer formed between a substrate and a recording layer and prevented from degradation in perpendicular orientation of the recording layer so as to achieve a higher recording surface density.

It is a third object of this invention to provide a perpendicular magnetic recording medium capable of achieving a higher recording surface density at a low cost.

In order to achieve the above-mentioned objects, the present inventor diligently studied. As a result, it has been found out that, by forming on a substrate of a nonmagnetic material a first nonmagnetic underlayer made of an amorphous nonmagnetic metal material, forming on the first nonmagnetic underlayer a second nonmagnetic metal underlayer made of a nonmagnetic material containing a hexagonal close packed (hcp) crystal structure, and forming a perpendicular magnetic recording layer on the second nonmagnetic metal underlayer, perpendicular orientation of the perpendicular magnetic recording layer can strictly be controlled.

The present inventor also found out that, in case where a soft magnetic underlayer is formed between the substrate and the perpendicular magnetic recording layer, the perpendicular orientation of the perpendicular magnetic recording layer is not degraded by forming the soft magnetic underlayer between the substrate and the first nonmagnetic underlayer and selecting an amorphous soft magnetic material as a material of the soft magnetic underlayer in conformity with the first nonmagnetic underlayer made of the amorphous material.

By the use of the result of fast Fourier transform (FFT) upon an electron diffraction image superposed on the result of observation by a scanning transmission electron microscope (TEM), the present inventor confirmed that the perpendicular orientation of the perpendicular magnetic recording layer is strictly controlled.

Perpendicular magnetic recording mediums according to this invention are as follows:

(1) A perpendicular magnetic recording medium comprising:
 a substrate of a nonmagnetic material;
 first and second nonmagnetic underlayers formed on the substrate; and
 a perpendicular magnetic recording layer formed on the first and the second nonmagnetic underlayers;
 the first nonmagnetic underlayer being made of an amorphous nonmagnetic metal material comprising a metal element which forms a face-centered cubic crystal structure by a simple substance;
 the second nonmagnetic underlayer being formed on the first nonmagnetic underlayer in contact with the first nonmagnetic underlayer and made of a nonmagnetic material comprising a hexagonal close packed structure;
 the perpendicular magnetic recording layer being formed on the second nonmagnetic underlayer in contact with the second nonmagnetic layer.

(2) The perpendicular magnetic recording medium according to the above-mentioned paragraph (1), wherein the first nonmagnetic underlayer is made of an amorphous nonmagnetic metal material comprising nickel.

(3) The perpendicular magnetic recording medium according to the above-mentioned paragraph (1), further comprising an amorphous soft magnetic underlayer formed between the substrate and the first nonmagnetic underlayer.

(4) The perpendicular magnetic recording medium according to the above-mentioned paragraph (2), further comprising an amorphous soft magnetic underlayer formed between the substrate and the first nonmagnetic underlayer.

(5) The perpendicular magnetic recording medium according to the above-mentioned paragraph (3), wherein the amorphous soft magnetic underlayer is made of an amorphous cobalt-based material.

(6) The perpendicular magnetic recording medium according to the above-mentioned paragraph (4), wherein the amorphous soft magnetic underlayer is made of an amorphous cobalt-based material.

(7) The perpendicular magnetic recording medium according to the above-mentioned paragraph (1), wherein the perpendicular magnetic recording layer is a granular magnetic layer.

(8) The perpendicular magnetic recording medium according to the above-mentioned paragraph (1), wherein the substrate is a glass substrate comprising an amorphous component.

(9) The perpendicular magnetic recording medium according to the above-mentioned paragraph (2)i, wherein the substrate is a glass substrate comprising an amorphous component.

(10) The perpendicular magnetic recording medium according to the above-mentioned paragraph (3), wherein the substrate is a glass substrate comprising an amorphous component.

(11) The perpendicular magnetic recording medium according to the above-mentioned paragraph (4), wherein the substrate is a glass substrate comprising an amorphous component.

(12) The perpendicular magnetic recording medium according to the above-mentioned paragraph (5), wherein the substrate is a glass substrate comprising an amorphous component.

(13) The perpendicular magnetic recording medium according to the above-mentioned paragraph (6), wherein the substrate is a glass substrate comprising an amorphous component.

(14) The perpendicular magnetic recording medium according to the above-mentioned paragraph (7), wherein the substrate is a glass substrate comprising an amorphous component.

The amorphous material referred to in the present specification is a "substance having no long-range order" in crystallography. For example, the amorphous material is a completely noncrystalline substance or a noncrystalline substance containing nanocrystals. Because such substance has no long-range order, no sharp peak derived from a crystalline substance is observed in an X-ray diffraction image. A substance being amorphous may be confirmed by the use of the result of fast Fourier transform (FFT) upon an electron diffraction image superposed on the result of observation by a scanning transmission electron microscope (TEM) as will later be described.

The granular magnetic layer referred to in the present specification is a magnetic layer in which a grain boundary portion containing a nonmagnetic substance is formed around each magnetic grain so as to suppress or interrupt exchange interaction between neighboring magnetic grains. Preferably, a substance forming the grain boundary portion is oxide. When the exchange interaction between neighboring magnetic grains is suppressed or interrupted, magnetic reversal of recording magnetization is smoothly caused so that a medium noise is suppressed. It is therefore possible to achieve a higher recording surface density.

In the perpendicular magnetic recording medium according to this invention, the first nonmagnetic underlayer is made of an amorphous nonmagnetic metal material containing a metal element which forms a face-centered cubic crystal structure by a simple substance. The second nonmagnetic underlayer is formed on the first nonmagnetic underlayer in contact with the first nonmagnetic underlayer and is made of a nonmagnetic material containing a hexagonal close packed structure. The perpendicular magnetic recording layer is formed on the second nonmagnetic underlayer in contact with the second nonmagnetic layer. With this structure, perpendicular orientation of the perpendicular magnetic recording layer can strictly be controlled.

Thus, the perpendicular magnetic recording medium according to this invention has the perpendicular magnetic recording layer excellent in perpendicular orientation. It is therefore possible to achieve a higher recording surface density of the magnetic recording medium.

In the above-mentioned perpendicular magnetic recording medium, excellent characteristics can be achieved when the first nonmagnetic underlayer is made of an amorphous nonmagnetic metal material containing nickel.

In case where the amorphous soft magnetic underlayer is formed between the substrate and the first nonmagnetic underlayer in the perpendicular magnetic recording medium according to this invention, a suitable magnetic circuit can be formed through a magnetic head, the perpendicular magnetic recording layer, and the soft magnetic underlayer without degrading the perpendicular orientation of the perpendicular magnetic recording layer.

When the amorphous soft magnetic underlayer is made of an amorphous cobalt-based material, a highly uniform non-crystalline state can be achieved without disturbing an amorphous structure of the first nonmagnetic underlayer.

Thus, in the perpendicular magnetic recording medium, the perpendicular orientation of the perpendicular magnetic recording layer is not degraded even if the soft magnetic underlayer is formed between the substrate and the perpendicular magnetic recording layer. It is therefore possible to achieve a higher recording surface density of the magnetic recording medium.

In case where the perpendicular magnetic recording layer is a granular magnetic layer in the perpendicular magnetic recording medium according to this invention, magnetic reversal in the perpendicular magnetic recording layer is smoothly caused so that a medium noise is suppressed. It is therefore possible to achieve a higher recording surface density.

In the perpendicular magnetic recording medium according to this invention, excellent characteristics can be achieved by the use of a glass substrate containing an amorphous component as a substrate.

According to this invention, the perpendicular magnetic recording medium easy in manufacture is provided. Therefore, the perpendicular magnetic recording medium capable of achieving a higher recording surface density can be supplied at a low cost.

DESCRIPTION OF PREFERRED EMBODIMENT

Figure 1:
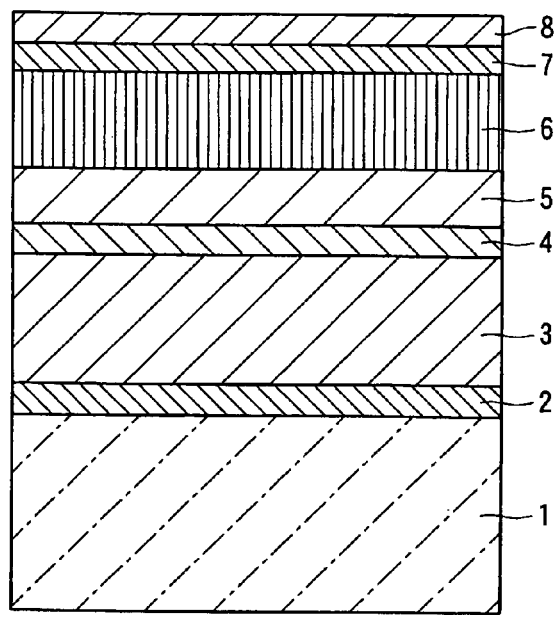
FIG. 1 is a sectional view showing a structure of a perpendicular magnetic recording medium according to an embodiment of this invention.

Now, an embodiment of this invention will be described in detail with reference to the drawing.

A perpendicular magnetic recording medium according to this invention is a recording medium which is constituted as, for example, a magnetic disk to be loaded in a HDD (hard disk drive) or the like and which is adapted to carry out high-density recording and reproducing operations according to a perpendicular magnetic recording system. For example, the perpendicular magnetic recording medium constituted as the magnetic disk according to this invention may have a predetermined diameter such as 1.0 inch, 1.8 inches, 2.5 inches, or 3.5 inches.

Referring to FIG. 1, description will be made of a structure of a perpendicular magnetic recording medium according to one embodiment of this invention.

As illustrated in FIG. 1, the perpendicular magnetic recording medium comprises a substrate 1 of a nonmagnetic material, first and second nonmagnetic underlayers 4 and 5 formed on the substrate 1, and a perpendicular magnetic recording layer 6 formed on the first and the second nonmagnetic underlayers 4 and 5. The nonmagnetic underlayers 4 and 5 and the perpendicular magnetic recording layer 6 form a laminate structure in which these layers are contiguously adjacent to one another without any other layer interposed therebetween.

As the substrate 1, a glass substrate made of a glass material containing an amorphous component may be used. Preferably, the glass material for the glass substrate 1 is a chemically strengthened glass obtained by chemically strengthening an aluminosilicate glass. It is desired that the substrate 1 is provided with a compressive stress layer formed as a surface layer by chemical strengthening.

On the substrate 1, a soft magnetic underlayer 3 is formed via an adhesion layer 2. The soft magnetic underlayer 3 has a thickness of about 300 nm. The adhesion layer 2 serves to enhance adhesive strength of the soft magnetic underlayer 3 to the substrate 1 and need not be provided if sufficient adhesive strength of the soft magnetic underlayer 3 to the substrate 1 is assured.

In order to assure the adhesive strength to the substrate 1 comprising the glass material containing the amorphous component, the soft magnetic underlayer 3 is desirably made of an amorphous material. Desirably, the soft magnetic underlayer 3 is made of a material having a suitable soft magnetic characteristic, for example, a cobalt (Co) based soft magnetic material. As the cobalt (Co) based soft magnetic material, a cobalt-zirconium (Co—Zr) alloy and a cobalt-tantalum-zirconium (Co—Ta—Zr) alloy are particularly preferable as a material of the soft magnetic underlayer 3.

The cobalt (Co) based soft magnetic material, particularly, a cobalt-zirconium (Co—Zr) soft magnetic material is a material capable of achieving a uniform noncrystalline state. Therefore, by forming the soft magnetic underlayer 3 by the use of such material, an amorphous nature of the first nonmagnetic underlayer 4 as an upper layer of the soft magnetic underlayer 3 is not disturbed so as to keep an excellent characteristic of the first nonmagnetic underlayer 4.

In case where the adhesion layer 2 is provided, the adhesion layer 2 is preferably made of an amorphous material such as a chromium-titanium (Cr—Ti) alloy in order to assure adhesive strength to the substrate 1 comprising the glass material containing the amorphous component and to the soft magnetic underlayer 3 comprising an amorphous material.

On the soft magnetic underlayer 3, the first nonmagnetic underlayer 4 is formed in contact with the soft magnetic underlayer 3. The first nonmagnetic underlayer 4 is made of an amorphous nonmagnetic metal material containing a metal element which forms a face-centered cubic (fcc) crystal structure by a simple substance. For example, the amorphous nonmagnetic metal material is an Ni-based alloy containing nickel (Ni). For example, the Ni-based alloy may be a nickel-tantalum (Ni—Ta) alloy, a chromium-nickel-tantalum (Cr—Ni—Ta) alloy, or a nickel-niobium (Ni—Nb) alloy. The first nonmagnetic underlayer 4 has a thickness of about 15 nm.

Between the soft magnetic underlayer 3 and the first nonmagnetic underlayer 4, an intervention layer may be formed. In this case, the intervention layer is preferably made of an amorphous nonmagnetic material so as not to disturb the amorphous nature of the first nonmagnetic underlayer 4. For example, the intervention layer may be an amorphous carbon layer.

The amorphous nonmagnetic metal material forming the first nonmagnetic underlayer 4 desirably contains nanocrystals having a face-centered cubic (fcc) crystal structure. The metal element contained in the first nonmagnetic underlayer 4 and forming a face-centered cubic (fcc) crystal structure by a simple substance may be niobium (Nb), palladium (Pd), lead (Pb), aluminum (Al), and so on in addition to nickel (Ni). Thus, the amorphous nonmagnetic metal material for use as the first nonmagnetic underlayer 4 may be a Nb-based alloy, a Pd-based alloy, a Pb-based alloy, an Al-based alloy, and so on in addition to the Ni-based alloy.

On the first nonmagnetic underlayer 4, the second nonmagnetic underlayer 5 is formed in contact with the first nonmagnetic underlayer 4. The second nonmagnetic underlayer 5 is made of a nonmagnetic material containing a hexagonal close packed (hcp) crystal structure. The second nonmagnetic underlayer 5 has a thickness of about 20 nm.

Being formed on the first nonmagnetic underlayer 4, the second nonmagnetic underlayer 5 is controlled by the effect of the first nonmagnetic underlayer 4 so that a c axis of the hexagonal close packed (hcp) crystal structure of the second nonmagnetic underlayer 5 is precisely perpendicularly oriented with respect to a substrate surface. Further, the second nonmagnetic underlayer 5 is controlled so that crystal grains of the hexagonal close packed (hcp) crystal structure are uniformly reduced in size. The above-mentioned mechanism will be described hereinafter.

As a first effect of this invention, by a combination of the first and the second nonmagnetic underlayers 4 and 5 described above, an interface between these layers is extremely flat and smooth. Therefore, the c axis of the hexagonal close packed (hcp) crystal structure of the second nonmagnetic underlayer 5 is precisely perpendicularly oriented.

A second effect of this invention is related to the nanocrystals contained in the amorphous nonmagnetic metal material of the first nonmagnetic underlayer 4 and having the face-centered cubic (fcc) crystal structure. In this invention, the first nonmagnetic underlayer 4 is formed as an amorphous layer containing a metal element, such as nickel (Ni), forming the face-centered cubic (fcc) crystal structure by a simple substance. In this case, the first nonmagnetic underlayer 4 as a whole has an amorphous structure but, in a microscopic region, has a structure in which the nanocrystals having the face-centered cubic (fcc) crystal structure are distributed and scattered. In the nanocrystals having the face-centered cubic (fcc) crystal structure, three atoms {fcc(111)} on diagonals of three faces of a crystal lattice cube form an equilateral triangle. Supposedly, the equilateral triangle is bonded in conformity to an equilateral triangle formed in the hexagonal close packed (hcp) crystal structure of the second nonmagnetic underlayer 5 and perpendicular to the c axis. Therefore, the hexagonal close packed (hcp) crystal structure of the second nonmagnetic underlayer 5 can be fine and uniform.

As the metal material forming the second nonmagnetic underlayer 5 and containing the hexagonal close packed (hcp) crystal structure, use may be made of, for example, a ruthenium (Ru) metal or a ruthenium (Ru) based alloy. In particular, in case where a nickel (Ni) based amorphous alloy material is selected as a material of the first nonmagnetic underlayer 4, it is preferable to select the ruthenium (Ru) metal or the ruthenium (Ru) based alloy as the material of the second nonmagnetic underlayer 5 combined with the first nonmagnetic underlayer 4. This is because a bondability between the face-centered cubic (fcc) structure of the nanocrystals contained in the nickel (Ni) based amorphous alloy material and the hexagonal close packed (hcp) structure of the ruthenium (Ru) metal or the ruthenium (Ru) based alloy is excellent so that the effect of this invention is favorably achieved.

On the second nonmagnetic underlayer 5, the perpendicular magnetic recording layer 6 is formed in contact with the second nonmagnetic underlayer 5. The perpendicular magnetic recording layer 6 comprises a hard magnetic material, such as a cobalt-platinum (Co—Pt) alloy, having a hexagonal close packed (hcp) structure and further contains a nonmagnetic material such as chromium (Cr) or silicon dioxide ($SiO_2$) to be constituted as a granular magnetic layer. Thus, in the perpendicular magnetic recording layer 6, the nonmagnetic material such as chromium (Cr) or silicon dioxide ($SiO_2$) is precipitated between neighboring magnetic grains so that exchange interaction between the neighboring magnetic grains is suppressed or interrupted. The perpendicular magnetic recording layer 6 has a thickness of about 15 nm and is formed by epitaxial growth (heteroepitaxial growth).

Being formed on the second nonmagnetic underlayer 5, the perpendicular magnetic recording layer 6 is promoted in reduction and uniformity in size of crystal grains under the effect of the second nonmagnetic underlayer 5. This is because the hexagonal close packed (hcp) crystal structure of the second nonmagnetic underlayer 5 is fine and uniform as described above.

Being formed on the second nonmagnetic underlayer 5, the perpendicular magnetic recording layer 6 is promoted in perpendicular orientation under the effect of the second nonmagnetic underlayer 5. Specifically, in the perpendicular magnetic recording layer 6, an easy magnetization axis is oriented in a direction perpendicular to a principal surface of the substrate 1. This is because the c axis of the hexagonal close packed (hcp) crystal structure of the second nonmagnetic underlayer 5 is well oriented in the direction perpendicular to the principal surface of the substrate 1 and, therefore, a c axis of a hexagonal close packed (hcp) crystal structure of the perpendicular magnetic recording layer 6 is oriented in conformity with the c axis of the hexagonal close packed (hcp) crystal structure of the second nonmagnetic underlayer 5.

That the first nonmagnetic underlayer 4 comprises the amorphous structure containing the nanocrystals, that the second nonmagnetic underlayer 5 comprises the material having the hexagonal close packed (hcp) crystal structure, and that the first and the second nonmagnetic underlayers 4 and 5 have excellent bondability can be confirmed by the result of observation (TEM cross-section image) by a scanning transmission electron microscope (TEM) and by the result of fast Fourier transform upon an electron diffraction image superposed on the above-mentioned result of observation.

Figure 2:
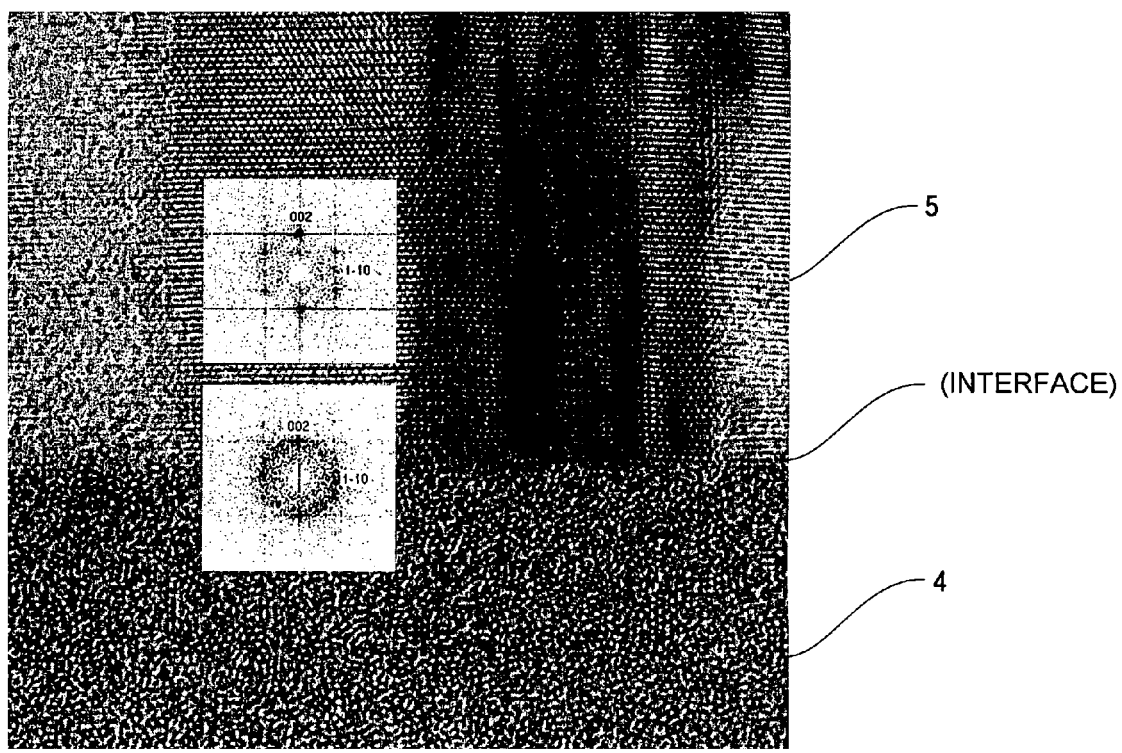
FIG. 2 is a view showing a result of observation by a scanning transmission electron microscope (TEM) and a result of fast Fourier transform upon an electron diffraction image superposed thereon.

Referring to FIG. 2, the result of observation by the scanning transmission electron microscope (TEM) and the result of fast Fourier transform upon the electron diffraction image superposed on the above-mentioned result of observation are shown together.

In FIG. 2, a lower part and an upper part correspond to the first and the second nonmagnetic underlayers 4 and 5 of the perpendicular magnetic recording medium in Example 1 which will later be described, respectively. In FIG. 2, a flat interface formed between the first and the second nonmagnetic underlayers 4 and 5 can be confirmed. A ring-shaped or a spot-like pattern superposed on the TEM cross-section image is the result of fast Fourier transform upon the electron diffraction image at a corresponding sectional position.

In the vicinity of the interface between the first and the second nonmagnetic underlayers 4 and 5, a ring-shaped electron diffraction image is observed. This shows that the first nonmagnetic underlayer 4 as a whole has an amorphous structure but contains the nanocrystals formed in the amorphous structure. In the second nonmagnetic underlayer 5 as the upper part, spot-like electron diffraction images are observed. This shows that hexagonal close packed (hcp) crystals are formed in the second nonmagnetic underlayer 5.

If the ring-shaped electron diffraction image observed in the vicinity of the interface between the first and the second nonmagnetic underlayers 4 and 5 and the spot-like electron diffraction images observed in the second nonmagnetic underlayer 5 are overlapped, the spot-like electron diffraction images coincide with the ring-shaped electron diffraction image. This indicates that the nanocrystals in the first nonmagnetic underlayer 4 and the hexagonal close packed (hcp) crystals in the second nonmagnetic underlayer 5 are bonded to each other in conformity.

Thus, in this invention, the first nonmagnetic underlayer 4 has the amorphous structure to provide the flat and smooth surface which contributes to the function of promoting the perpendicular orientation of the crystal structure of the second nonmagnetic underlayer 5. Simultaneously, the first nonmagnetic underlayer 4 has a nanocrystal structure which contributes to the function of promoting fineness and uniformity of the crystal structure of the second nonmagnetic underlayer 5.

As described above, in this invention, it is possible to achieve an underlayer structure extremely uniform and fine and excellent in perpendicular orientation. Therefore, the perpendicular magnetic recording layer 6 formed on the underlayer structure by the epitaxial growth (heteroepitaxial growth) has a uniform and fine structure and is excellent in perpendicular orientation.

In this invention, the magnetic material of the perpendicular magnetic recording layer 6 is not particularly restricted as far as it is the hard magnetic material. Preferably, however, the perpendicular magnetic recording layer 6 is a granular magnetic layer, in particular, a granular magnetic layer containing a cobalt (Co) based ferromagnetic material. The cobalt (Co) based ferromagnetic material has a magnetic anisotropy in a direction of the c axis of the hexagonal close packed (hcp) crystal structure. Therefore, in the perpendicular magnetic recording layer 6, the c axis is controlled to be oriented in the direction perpendicular to the substrate surface. On the other hand, the material having the hexagonal close packed (hcp) crystal structure suffers a problem that, as the perpendicular orientation of the c axis is promoted, the formation of the nonmagnetic grain boundary portion for interrupting or suppressing the exchange interaction between neighboring magnetic grains is inhibited. In the granular magnetic layer containing the cobalt (Co) based ferromagnetic material, such inhibiting factor is lessened so as to positively form the nonmagnetic grain boundary portion. Thus, the cobalt (Co) based ferromagnetic material is suitable as the magnetic material of the perpendicular magnetic recording layer 6 in this invention.

On the perpendicular magnetic recording layer 6, a protection layer 7 is formed. The protection layer 7 is made of hydrogenated carbon and has a thickness of about 5 nm. The protection layer 6 serves to protect the perpendicular magnetic recording medium from the impact of a magnetic head (not shown). On the protection layer 7, a lubrication layer 8 is formed. The lubrication layer 8 is made of perfluoropolyether (PFPE) or the like and has a thickness of about 1 nm. The lubrication layer 8 serves to mitigate the impact of the magnetic head (not shown).

The soft magnetic underlayer 3 is formed between the substrate 1 and the first nonmagnetic underlayer 4. The perpendicular magnetic recording medium is a so-called double-layer perpendicular magnetic recording medium because of presence of the soft magnetic underlayer 3. Therefore, in the perpendicular magnetic recording medium, a suitable magnetic circuit is formed through the magnetic head (not shown), the perpendicular magnetic recording layer 6, and the soft magnetic underlayer 3 during magnetic recording. With this structure, the soft magnetic under layer 3 assists the magnetic recording in accordance with a mirror-image effect.

Now, specific examples of this invention will be described in detail together with comparative examples.

EXAMPLE 1

In Example 1, a perpendicular magnetic recording medium as a magnetic disk was produced in the following manner. An amorphous aluminosilicate glass was formed into a disk-like shape by direct pressing to produce a glass disk. The glass disk was successively subjected to grinding, polishing, and chemical strengthening to obtain a nonmagnetic flat disk substrate comprising a chemically strengthened glass disk.

The surface roughness of a principal surface of the disk substrate was measured by an atomic force microscope (AFM). As a result, the substrate had a flat and smooth surface profile given by Rmax of 4.8 nm and Ra of 0.42 nm. Herein, the surface roughness Rmax is defined in Japanese Industrial Standard JIS B0601 as a maximum height representative of a difference between a highest point and a lowest point of the surface and described, for example, in U.S. Pat. No. 6,544,893B2. The surface roughness Ra is also defined in Japanese Industrial Standard JIS B0601 as an arithmetic average roughness or a center-line-mean roughness and described in U.S. Pat. No. 6,544,893B2.

On the substrate obtained as mentioned above, the adhesion layer 2, the soft magnetic underlayer 3, the first nonmagnetic underlayer 4, the second nonmagnetic underlayer 5, and the perpendicular magnetic recording layer 6 were successively deposited by DC magnetron sputtering using a deposition apparatus evacuated into vacuum. Deposition was carried out in an argon (Ar) gas atmosphere. The pressure of an argon gas was 45 mTorr.

At least in deposition of the perpendicular magnetic recording layer 6, the pressure of the argon gas is preferably 10 mTorr or more.

The adhesion layer 2 was deposited as a chromium (Cr) based amorphous layer having a thickness of 20 nm. Specifically, the adhesion layer 2 was deposited by the use of an amorphous chromium-titanium (Cr—Ti) alloy target.

The soft magnetic underlayer 3 was deposited as an amorphous (noncrystalline) cobalt-tantalum-zirconium (Co—Ta—Zr) (Co: 88 at %, Ta: 7 at %, Zr: 5 at %) alloy layer having a thickness of 300 nm by the use of a cobalt-zirconium-tantalum alloy target. The cobalt-zirconium-tantalum alloy is a soft magnetic material exhibiting a soft magnetic characteristic.

The first nonmagnetic underlayer 4 was deposited as a nonmagnetic amorphous nickel-tantalum (Ni—Ta) (Ni: 45 at %, Ta: 55 at %) alloy layer by the use of a nickel-tantalum alloy target. The first nonmagnetic underlayer 4 had a thickness of 15 nm. A part of the disk at this stage of deposition was sampled and the surface roughness was measured by the atomic force microscope (AFM). As a result, the disk had a flat and smooth surface profile given by Rmax of 5.1 nm and Ra of 0.48 nm.

By the use of a vibrating sample magnetometer (VSM), the magnetic characteristics of the disk at this stage of deposition was measured. As a result, the coercive force (Hc) was equal to 2 oersted and the saturation magnetic flux density was equal to 810 emu/cc. Thus, it was confirmed that the disk exhibited an excellent soft magnetic characteristic.

Then, the second nonmagnetic underlayer 5 and the perpendicular magnetic recording layer 6 were successively deposited. The second nonmagnetic underlayer 5 was deposited by the use of a ruthenium metal target to be a nonmagnetic ruthenium (Ru) metal layer having a hexagonal close packed (hcp) crystal structure and having a thickness of 20 nm.

Next, the perpendicular magnetic recording layer 6 having a thickness of 15 nm and having a hexagonal close packed (hcp) crystal structure was deposited by the use of a hard magnetic target comprising a cobalt-chromium-platinum-silicon dioxide (Co—Cr—Pt—($SiO_2$)) alloy ((Co: 64 at %, Cr: 16 at %, Pt: 20 at %): 92 mol % —$SiO_2$: 8 mol %). The above-mentioned material of the perpendicular magnetic recording layer 6 is an alloy granular material.

Next, by the use of a mixed gas comprising argon (Ar) and 30% hydrogen added thereto, a carbon target was sputtered to form the protection layer 7 made of hydrogenated carbon and having a thickness of 5 nm. The protection layer 7 of hydrogenated carbon has a sufficient film hardness and can protect the perpendicular magnetic recording layer 6 from the impact of the magnetic head.

On the protection layer 7, the lubrication layer 8 of perfluoropolyether (PFPE) was formed by dip coating. The lubrication layer 8 had a thickness of 1 nm.

By the above-mentioned process, the perpendicular magnetic recording medium as the magnetic disk was produced.

The perpendicular magnetic recording medium had magnetic characteristics shown in Table 1. The coercive force (Hc) was equal to 4600 oersted, the squareness ratio (Mr/Ms) was equal to 1.00, and the signal-to-noise ratio (S/N ratio) at a recording density of 800 kFci was 25.5 dB. Thus, excellent characteristics have been confirmed.

In each of Example 1 and other examples which will later be described, the materials of the adhesion layer 2, the soft magnetic underlayer 3, the first nonmagnetic underlayer 4, the second nonmagnetic underlayer 5, and the perpendicular magnetic layer 6 had crystal structures and compositions shown in Table 2.

TABLE 1

(Recoding Density 800 kFci)

|  | soft magnetic underlayer 300 nm thick | 1st underlayer 15 nm thick | 2nd underlayer 20 nm thick | magnetic layer 15 nm thick | coercive force (Oe) | Mr/Ms (squareness ratio) | S/N ratio (dB) |
|---|---|---|---|---|---|---|---|
| Example 1 | CoTaZr | NiTa | Ru | CoCrPtSiO$_2$ | 4600 | 1.00 | 25.5 |
| Example 2 | CoTaZr | NiTa | Ru | CoCrPtB | 4500 | 0.98 | 21.5 |
| Example 3 | CoTaZr | CrNiTa | Ru | CoCrPtSiO$_2$ | 4550 | 1.00 | 25.0 |
| Example 4 | CoTaZr | NiNb | Ru | CoCrPtSiO$_2$ | 4000 | 1.00 | 24.0 |
| Example 5 | CoTaZr | NiTa | Ru—SiO$_2$ | CoCrPtSiO$_2$ | 4650 | 1.00 | 26.5 |
| Example 6 | NiFe | NiTa | Ru | CoCrPtSiO$_2$ | 4000 | 0.80 | 21.1 |
| Comparative Example 1 | CoTaZr | Ti | Ru | CoCrPtSiO$_2$ | 3800 | 0.79 | 20.1 |
| Comparative Example 2 | CoTaZr | NiTa | (none) | CoCrPtSiO$_2$ | 500 | 0.10 | 12.1 |
| Comparative | CoTaZr | (none) | Ru | CoCrPtSiO$_2$ | 2600 | 0.91 | 20.2 |

TABLE 1-continued (Recoding Density 800 kFci)

| | soft magnetic underlayer 300 nm thick | 1st underlayer 15 nm thick | 2nd underlayer 20 nm thick | magnetic layer 15 nm thick | coercive force (Oe) | Mr/Ms (squareness ratio) | S/N ratio (dB) |
|---|---|---|---|---|---|---|---|
| Example 3 | | | | | | | |

TABLE 2

| | crystal structure | composition |
|---|---|---|
| CaTaZr | amorphous | Co 88 at %-Ta 7 at %-Zr 5 at % |
| NiFe | fcc | Ni 48 at %-Fe 52 at % |
| Ti | hcp | Ti 100% |
| NiTa | amorphous | Ni 45 at %-Ta 55 at % |
| CrNiTa | amorphous | Cr 50 at %-Ni 40 at %-Ta 10 at % |
| NiNb | amorphous | Ni 60 at %-Nb 40 at % |
| Ru | hcp | Ru 100% |
| Ru—$SiO_2$ | hcp | Ru 95 mol %-$SiO_2$ 5 mol % |
| CoCrPt$SiO_2$ | hcp | (Co 64 at % Cr 16 at % Pt 20 at %) 92 mol %-$SiO_2$ 8 mol % |
| CoCrPtB | hcp | Co 66 at %-Cr 17 at %-Pt 13 at %-B 4 at % |

EXAMPLE 2

In Example 2, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a nonmagnetic amorphous nickel-tantalum (Ni—Ta) (Ni: 45 at %, Ta: 55 at %) alloy layer. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-boron (Co—Cr—Pt—(B)) alloy (Co: 66 at %, Cr: 17 at %, Pt: 13 at %, B: 4 at %). The materials of other layers and the producing conditions were similar to those in Example 1.

The perpendicular magnetic recording medium had magnetic characteristics shown in Table 1. The coercive force (Hc) was equal to 4500 oersted, the squareness ratio (Mr/Ms) was equal to 0.98, and the signal-to-noise ratio (S/N ratio) at a recording density of 800 kFci was 21.5 dB. Thus, excellent characteristics have been confirmed.

EXAMPLE 3

In Example 3, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a nonmagnetic amorphous chromium-nickel-tantalum (Cr—Ni—Ta) (Cr: 50 at %, Ni: 40 at %, Ta: 10 at %) alloy layer. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol % —$SiO_2$: 8 mol %). The materials of other layers and the producing conditions were similar to those in Example 1.

The perpendicular magnetic recording medium had magnetic characteristics shown in Table 1. The coercive force (Hc) was equal to 4550 oersted, the squareness ratio (Mr/Ms) was equal to 1.00, and the signal-to-noise ratio (S/N ratio) at a recording density of 800 kFci was 25.0 dB. Thus, excellent characteristics have been confirmed.

EXAMPLE 4

In Example 4, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a nonmagnetic amorphous nickel-niobium (Ni—Nb) (Ni: 60 at %, Nb: 40 at %) alloy layer. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol % —$SiO_2$: 8 mol %). The materials of other layers and the producing conditions were similar to those in Example 1.

The perpendicular magnetic recording medium had magnetic characteristics shown in Table 1. The coercive force (Hc) was equal to 4000 oersted, the squareness ratio (Mr/Ms) was equal to 1.00, and the signal-to-noise ratio (S/N ratio) at a recording density of 800 kFci was 24.0 dB. Thus, excellent characteristics have been confirmed.

EXAMPLE 5

In Example 5, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a nonmagnetic amorphous nickel-tantalum (Ni—Ta) (Ni: 45 at %, Ta: 55 at %) alloy layer. The second nonmagnetic underlayer 5 was a nonmagnetic metal layer containing ruthenium (Ru) having a hexagonal close packed (hcp) crystal structure and silicon dioxide ($SiO_2$) (Ru: 95 mol % —$SiO_2$: 5 mol %). The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol % —$SiO_2$: 8 mol %). The materials of other layers and the producing conditions were similar to those in Example 1.

The perpendicular magnetic recording medium had magnetic characteristics shown in Table 1. The coercive force (Hc) was equal to 4650 oersted, the squareness ratio (Mr/Ms)

was equal to 1.00, and the signal-to-noise ratio (S/N ratio) at a recording density of 800 kFci was 26.5 dB. Thus, excellent characteristics have been confirmed.

EXAMPLE 6

In Example 6, on a substrate similar to that in Example 1, the following layers were successively deposited. As shown in Table 1, the soft magnetic underlayer 3 was a nickel-iron (Ni—Fe) (Ni: 48 at %, Fe: 52 at %) alloy layer having a face-centered cubic (fcc) crystal structure. The first nonmagnetic underlayer 4 was a nonmagnetic amorphous nickel-tantalum (Ni—Ta) (Ni: 45 at %, Ta: 55 at %) alloy layer. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol %—$SiO_2$: 8 mol %). The materials of other layers and the producing conditions were similar to those in Example 1.

The perpendicular magnetic recording medium had magnetic characteristics shown in Table 1. The coercive force (Hc) was equal to 4000 oersted, the squareness ratio (Mr/Ms) was equal to 0.80, and the signal-to-noise ratio (S/N ratio) at a recording density of 800 kFci was 21.1 dB. Thus, excellent characteristics have been confirmed.

COMPARATIVE EXAMPLE 1

In Comparative Example 1, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a titanium (Ti) (Ti: 100 at %) metal layer. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol %—$SiO_2$: 8 mol %). The materials of other layers and the producing conditions were similar to those in Example 1.

The perpendicular magnetic recording medium had magnetic characteristics shown in Table 1. The coercive force (Hc) was equal to 3800 oersted, the squareness ratio (Mr/Ms) was equal to 0.79, and the signal-to-noise ratio (S/N ratio) at a recording density of 800 kFci was 20.1 dB. Thus, it has been confirmed that the characteristics were inferior than those of the foregoing examples.

COMPARATIVE EXAMPLE 2

In Comparative Example 2, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was a nonmagnetic amorphous nickel-tantalum (Ni—Ta) (Ni: 45 at %, Ta: 55 at %) alloy layer. The second nonmagnetic underlayer 5 was not formed. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol %—$SiO_2$: 8 mol %). The materials of other layers and the producing conditions were similar to those in Example 1.

The perpendicular magnetic recording medium had magnetic characteristics shown in Table 1. The coercive force (Hc) was equal to 500 oersted, the squareness ratio (Mr/Ms) was equal to 0.10, and the signal-to-noise ratio (S/N ratio) at a recording density of 800 kFci was 12.1 dB. Thus, it has been confirmed that the characteristics were inferior than those of the foregoing examples.

COMPARATIVE EXAMPLE 3

In Comparative Example 3, on a substrate similar to that in Example 1, the following layers were successively deposited. As shown in Table 1, the soft magnetic underlayer 3 was an amorphous (noncrystalline) cobalt-tantalum-zirconium (Co—Ta—Zr) (Co: 88 at %, Ta: 7 at %, Zr: 5 at %) alloy layer. The first nonmagnetic underlayer 4 was not formed. The second nonmagnetic underlayer 5 was a nonmagnetic ruthenium (Ru) metal layer having a hexagonal close packed (hcp) crystal structure. The perpendicular magnetic recording layer 6 was a hard magnetic layer comprising a cobalt-chromium-platinum-silicon dioxide (Co—Cr—Pt—($SiO_2$)) alloy ((Co: 64 at %, Cr: 16 at %, Pt: 20 at %): 92 mol %—$SiO_2$: 8 mol %). The materials of other layers and the producing conditions were similar to those in Example 1.

The perpendicular magnetic recording medium had magnetic characteristics shown in Table 1. The coercive force (Hc) was equal to 2600 oersted, the squareness ratio (Mr/Ms) was equal to 0.91, and the signal-to-noise ratio (S/N ratio) at a recording density of 800 kFci was 20.2 dB. Thus, it has been confirmed that the characteristics were inferior than those of the foregoing examples.

While this invention has thus far been described in conjunction with the preferred embodiment and the specific examples thereof, it will be readily possible for those skilled in the art to put this invention into practice in various other manners.

What is claimed is:

1. A perpendicular magnetic recording medium comprising:
    a substrate of a nonmagnetic material;
    first and second nonmagnetic underlayers formed on the substrate; and
    a perpendicular magnetic recording layer formed on the first and the second nonmagnetic underlayers;
    wherein the substrate is a glass substrate comprising an amorphous or nanocrystalline component which exhibits no long-range order as evidenced by no sharp peak derived from a crystalline substance when observed in an X-ray diffraction image;
    the perpendicular magnetic recording medium further comprising an amorphous or nanocrystalline soft magnetic underlayer formed between the substrate and the first nonmagnetic underlayer, the amorphous or nanocrystalline soft magnetic underlayer exhibiting no long-range order as evidenced by no sharp peak derived from a crystalline substance when observed in an X-ray diffraction image;
    the first nonmagnetic underlayer being made of an amorphous substance or a nanocrystalline substance of a nonmagnetic metal material comprising a metal element nickel which forms a face-centered cubic crystal structure by a simple substance, the amorphous substance or the nanocrystalline substance exhibiting no long-range order as evidenced by no sharp peak derived from a crystalline substance when observed in an X-ray diffraction image, said first nonmagnetic underlayer including said nickel at 40-60 at %, both inclusive;

the second nonmagnetic underlayer being formed on the first nonmagnetic underlayer in direct contact with the first nonmagnetic underlayer and without any layer in-between, and made of a nonmagnetic material consisting of ruthenium (Ru) and SiO$_2$, having a hexagonal close packed structure;

the perpendicular magnetic recording layer being formed on the second nonmagnetic underlayer in contact with the second nonmagnetic layer, the perpendicular magnetic recording layer being a granular magnetic layer in which a grain boundary portion comprising a nonmagnetic substance is formed around each magnetic grain, wherein said amorphous or nanocrystalline soft magnetic underlayer is approximately 300 nm, comprises cobalt-tantalum-zirconium (Co—Ta—Zr) and has a thickness in a range of 15-20 times larger than that of the first or second underlayer.

2. The perpendicular magnetic recording medium according to claim 1, wherein the amorphous or nanocrystalline soft magnetic underlayer is made of an amorphous or nanocrystalline cobalt-based material which exhibits no long-range order as evidenced by no sharp peak derived from a crystalline substance when observed in an X-ray diffraction image.

3. The perpendicular magnetic recording medium according to claim 1, wherein said perpendicular magnetic recording layer is the granular magnetic layer which comprises a cobalt-platinum (Co—Pt) alloy and a nonmagnetic material selected from the group consisting of chromium (Cr) and silicon dioxide (SiO$_2$).

4. The perpendicular magnetic recording medium according to claim 1, wherein said first nonmagnetic underlayer is made of the amorphous substance or the nanocrystalline substance of the nonmagnetic metal material selected from the group consisting of a nickel-tantalum (Ni—Ta) alloy, a chromium-nickel-tantalum (Cr—Ni—Ta) alloy, and a nickel-niobium (Ni—Nb) alloy.

5. The perpendicular magnetic recording medium according to claim 1, wherein said first nonmagnetic underlayer further comprises an element selected from the group consisting of Ta and Nb.

6. The perpendicular magnetic recording medium according to claim 1, wherein said first or second underlayer is approximately 15-20 nm.

* * * * *